US010735247B2

(12) United States Patent
Subramani

(10) Patent No.: US 10,735,247 B2
(45) Date of Patent: Aug. 4, 2020

(54) SPANNING TREE PROTOCOL TRAFFIC HANDLING SYSTEM

(71) Applicant: Dell Products L.P., Round Rock, TX (US)

(72) Inventor: Loganathan Subramani, TamiNadu (IN)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 16/158,013

(22) Filed: Oct. 11, 2018

(65) Prior Publication Data

US 2020/0119974 A1 Apr. 16, 2020

(51) Int. Cl.
*H04L 12/24* (2006.01)
*H04L 12/751* (2013.01)

(52) U.S. Cl.
CPC .......... *H04L 41/0654* (2013.01); *H04L 45/02* (2013.01)

(58) Field of Classification Search
CPC ........................... H04L 41/0654; H04L 45/02
See application file for complete search history.

(56) References Cited

U.S. PATENT DOCUMENTS

| | | | | |
|---|---|---|---|---|
| 8,427,969 B1 * | 4/2013 | Juillard | H04L 41/12 | 370/252 |
| 2004/0047300 A1 * | 3/2004 | Enonnoto | H04L 12/462 | 370/256 |
| 2006/0050741 A1 * | 3/2006 | Shabtay | H04L 12/4625 | 370/492 |
| 2014/0153445 A1 * | 6/2014 | Huang | H04L 45/48 | 370/256 |
| 2016/0056888 A1 * | 2/2016 | Sun | H04L 1/22 | 398/2 |

* cited by examiner

*Primary Examiner* — Afshawn M Towfighi
(74) *Attorney, Agent, or Firm* — Haynes and Boone, LLP

(57) ABSTRACT

A spanning tree protocol traffic handling system includes a first networking device and a second networking device that is coupled to the first networking device via a first access port that is included on the second networking device. The second networking device receives a Bridge Protocol Data Unit (BPDU) frame through the first access port from the first networking device. The second networking device sends an acknowledgement that includes a BPDU stop request and that is configured to cause the first networking device to stop sending BPDU frames to the first access port. The second networking device then sets an access port state of the first access port to a forwarding state.

20 Claims, 7 Drawing Sheets

SWITCH DEVICE 204/304/402
SWITCH DEVICE 202/302/402
700
BPDU FRAME
702
ACK + BPDU STOP REQUEST
704
ACK
706

SPANNING TREE PROTOCOL TRAFFIC HANDLING SYSTEM

BACKGROUND

The present disclosure relates generally to information handling systems, and more particularly to handling spanning tree protocol traffic in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices, utilize the spanning tree protocol in order to build a logical, loop-free topology in a network. For example, the spanning tree protocol may operate to create a spanning tree within a network of switch devices that operate as connected layer-2 bridges by disabling links that are not part of the spanning tree in order to leave a single active path between any two network nodes. However, the use of the spanning tree protocol can raise some issues in some situations such as, for example, when a switch device that has the spanning tree protocol enabled is connected to an access port of another switch device. For example, some switch devices may not have a dedicated management port that may be connected to a Top of Rack (ToR) switch to manage the switch device. However, most or all of the ports of ToR switches are typically configured as access ports for connecting to end user devices, rather than trunk ports for connecting to switch devices. These access ports may have spanning tree protocol blocking mechanisms such as, for example, bridge protocol data unit (BPDU) Guards and/or BPDU Filters that prevent a rogue switch that has the spanning tree protocol enabled from influencing the spanning tree protocol topology of the network through these ports. Thus, a switch device that is coupled to an access port of a ToR switch for management purposes may send BPDU frames to the ToR switch when the spanning tree protocol is enabled, and the ToR switch will block the access port to prevent a spanning tree protocol topology change, which results in the switch device connected to the access port of the ToR switch being inaccessible.

Accordingly, it would be desirable to provide an improved spanning tree protocol traffic handling system.

SUMMARY

According to one embodiment, an information handling system (IHS), includes a first access port; a processing system that is coupled to the first access port; and a memory system that is coupled to the processing system and that includes instruction that, when executed by the processing system, cause the processing system to provide a spanning tree protocol engine that is configured to: receive a Bridge Protocol Data Unit (BPDU) frame through the first access port; send an acknowledgement that includes a BPDU stop request and that is configured to cause BPDU frames to stop being sent to the first access port; and set an access port state of the first access port to a forwarding state.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
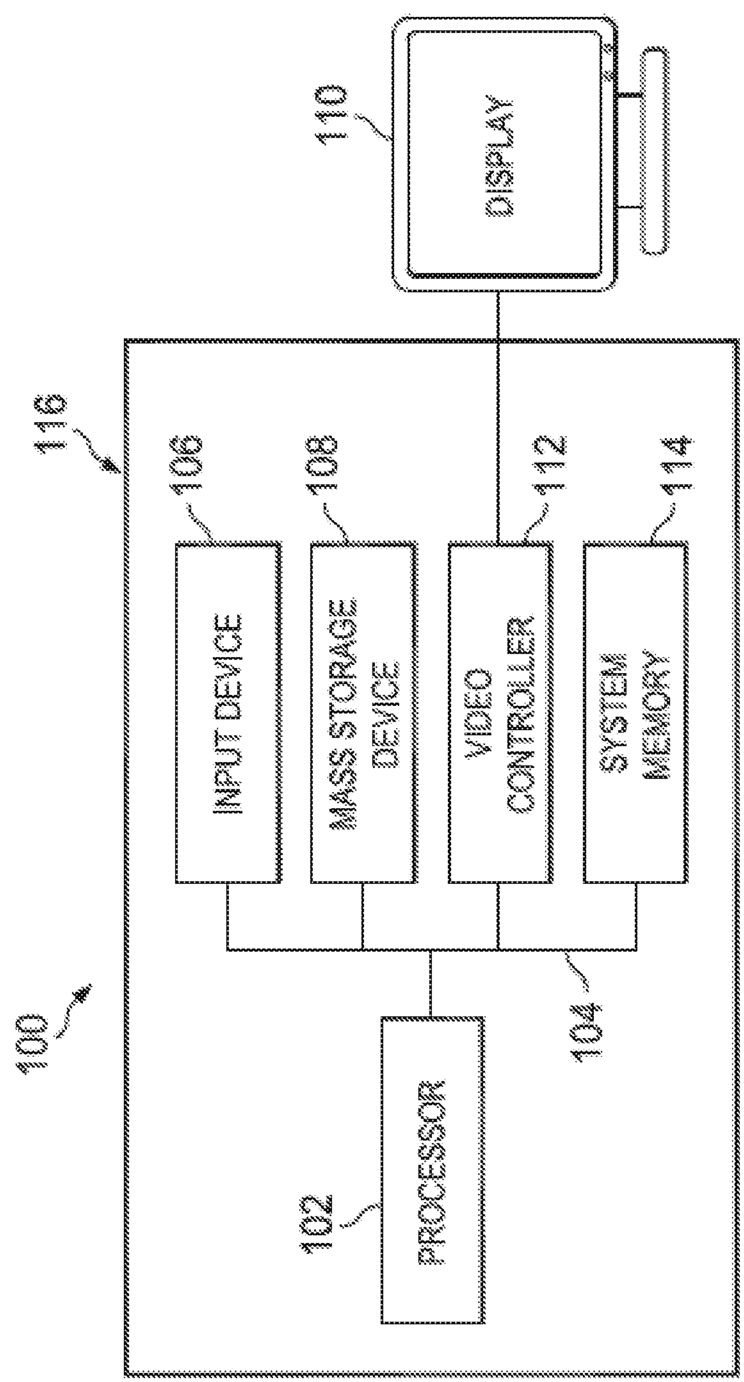
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
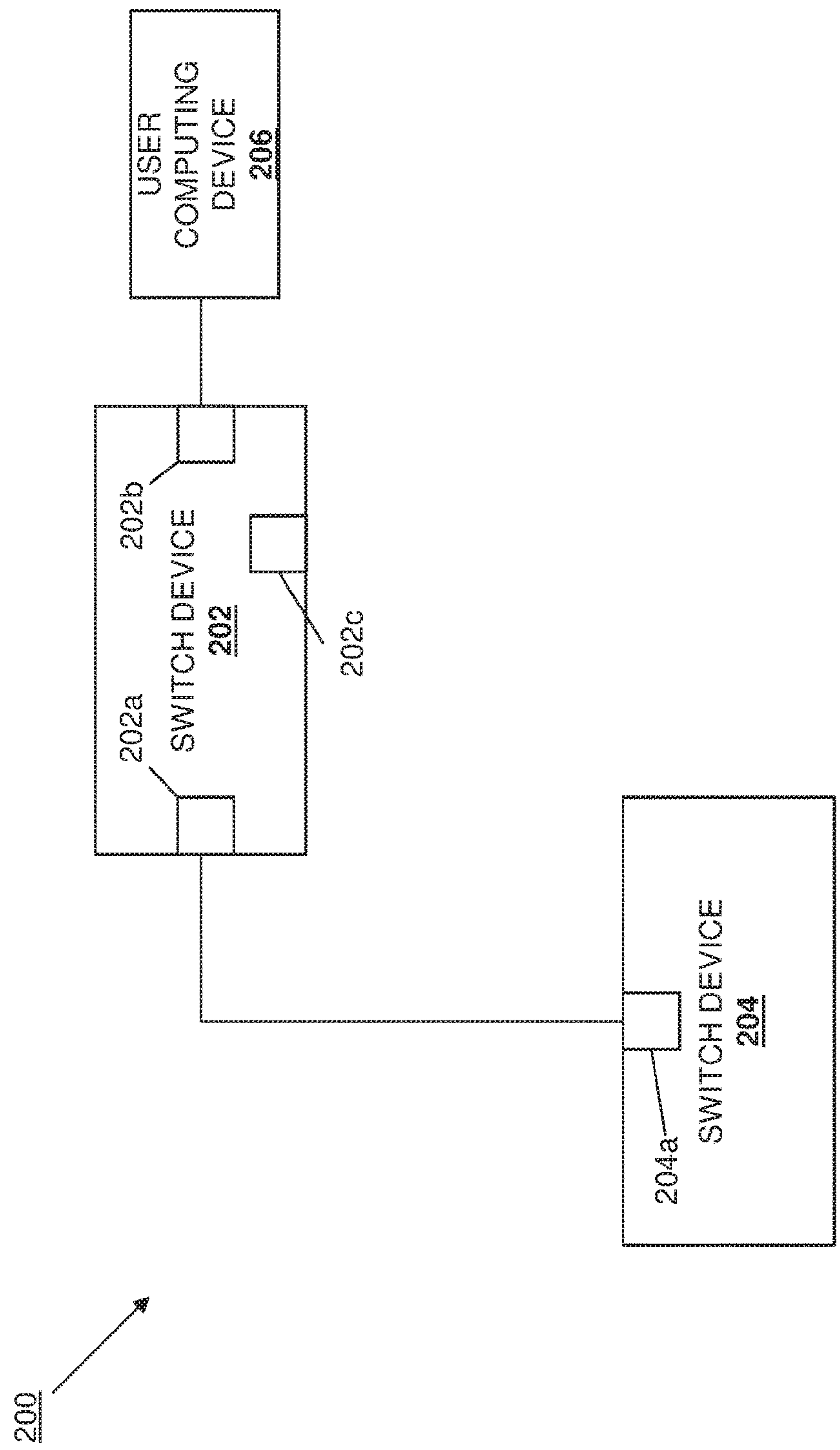
FIG. 2 is a schematic view illustrating an embodiment of a network of switch devices.

Referring now to FIG. 2, an embodiment of a network 200 provided by networking devices is illustrated, the operation of which is described in some of the examples discussed below. The network 200 includes a plurality of networking devices such as the switch devices 202 and 204 illustrated in FIG. 2, any or all of which may be provided by the IHS 100 discussed above with reference to FIG. 1, and/or include some or all of the components of the IHS 100. While the networking devices in the network 200 are discussed as switch devices, one of skill in the art in possession of the present disclosure would understand that the switch devices 202 and 204 may be provided by bridge devices, router devices, and/or any other networking device that can be configured with a spanning tree protocol. In the illustrated embodiment, the switch device 202 includes a port 202*a* that is linked to a port 204*a* on the switch device 204 (e.g., via an Ethernet cable), and a port 202*b* that is linked to a user computing device 206 (e.g., via an Ethernet cable). The ports 202*a* and 202*b* of the switch device 202 may be access ports that are configured to provide access to the network 200 to user computing devices such as the user computing device 206, and configured to block spanning tree protocol traffic as discussed below. Furthermore, the switch device 202 may include a port 202*c* that may be a trunk port that is configured to connect to switch devices and allow spanning tree protocol traffic. In various embodiments, the switch device 202 may be a top of rack (ToR) switch, and the switch device 204 may be a campus network switch, although other types of switch devices will benefit from the teachings of the present disclosure and thus fall within its scope as well.

Figure 3:
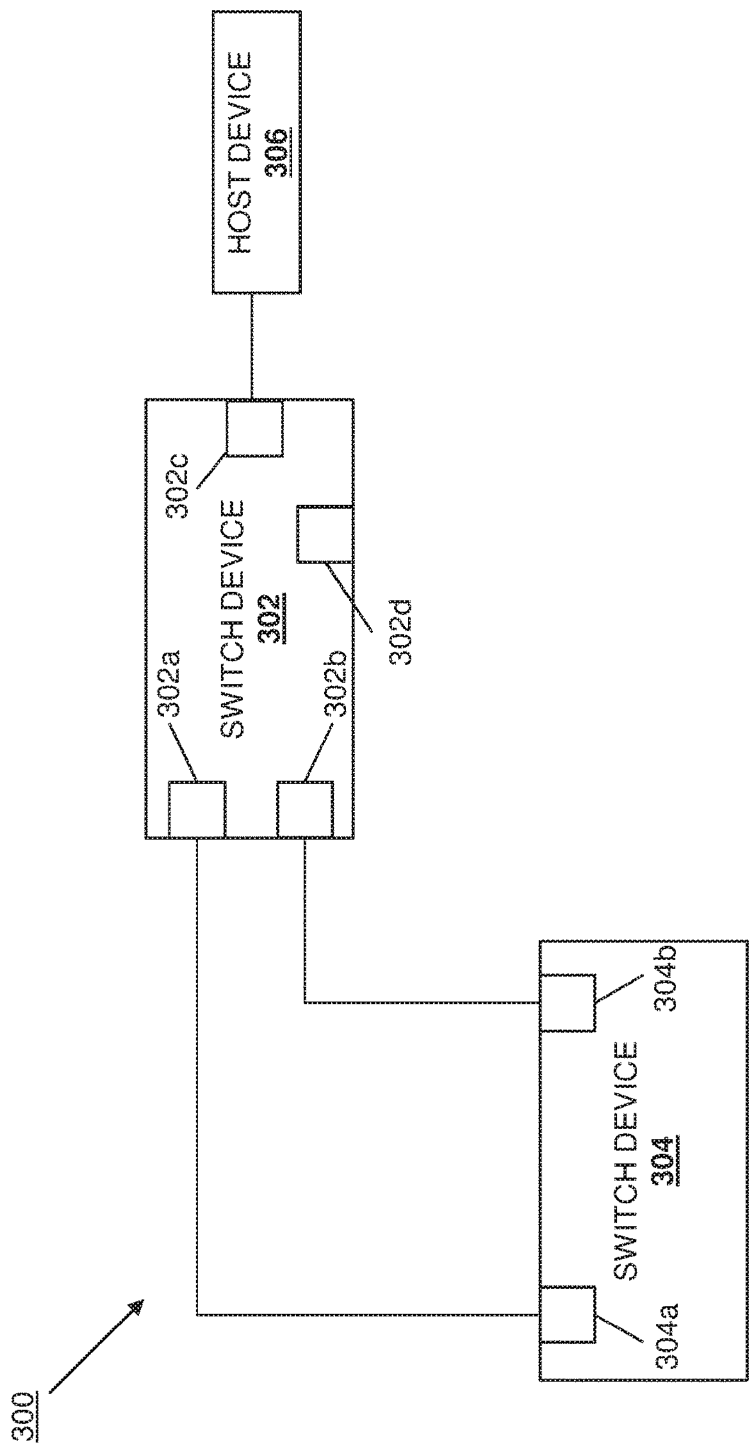
FIG. 3 is a schematic view illustrating an embodiment of a network of switch devices.

Referring now to FIG. 3, an embodiment of a network 300 provided by networking devices is illustrated, the operation of which is described in some of the examples discussed below. The network 300 includes a plurality of networking devices such as the switch devices 302 and 304 illustrated in FIG. 3, any or all of which may be provided by the IHS 100 discussed above with reference to FIG. 1, and/or include some or all of the components of the IHS 100. While the networking devices in the network 300 are discussed as switch devices, one of skill in the art in possession of the present disclosure would understand that the switch devices 302 and 304 may be provided by bridge devices, router devices, and/or any other networking device that is configured with a spanning tree protocol. In the illustrated embodiment, the switch device 302 includes a port 302*a* that is linked to a port 304*a* on the switch device 304 (e.g., via an Ethernet cable), a port 302*b* that is linked to a port 304*b* on the switch device 304 (e.g., via an Ethernet cable), and a port 302*c* that is linked to a user computing device 306 (e.g., via an Ethernet cable). The ports 302*a*, 302*b*, and 302*c* of the switch device 202 may be access ports that are configured to provide access to the network 300 to user computing devices such as the user computing device 306, and configured to block spanning tree protocol traffic as discussed below. Furthermore, the switch device 302 may include a port 302*d* that may be a trunk port that is configured to connect to switch devices and allow spanning tree protocol traffic. In various embodiments, the switch device 302 may be a ToR switch and the switch device 304 may be a campus network switch, although other types of switch devices will benefit from the teachings of the present disclosure and thus fall within its scope as well.

Figure 4:
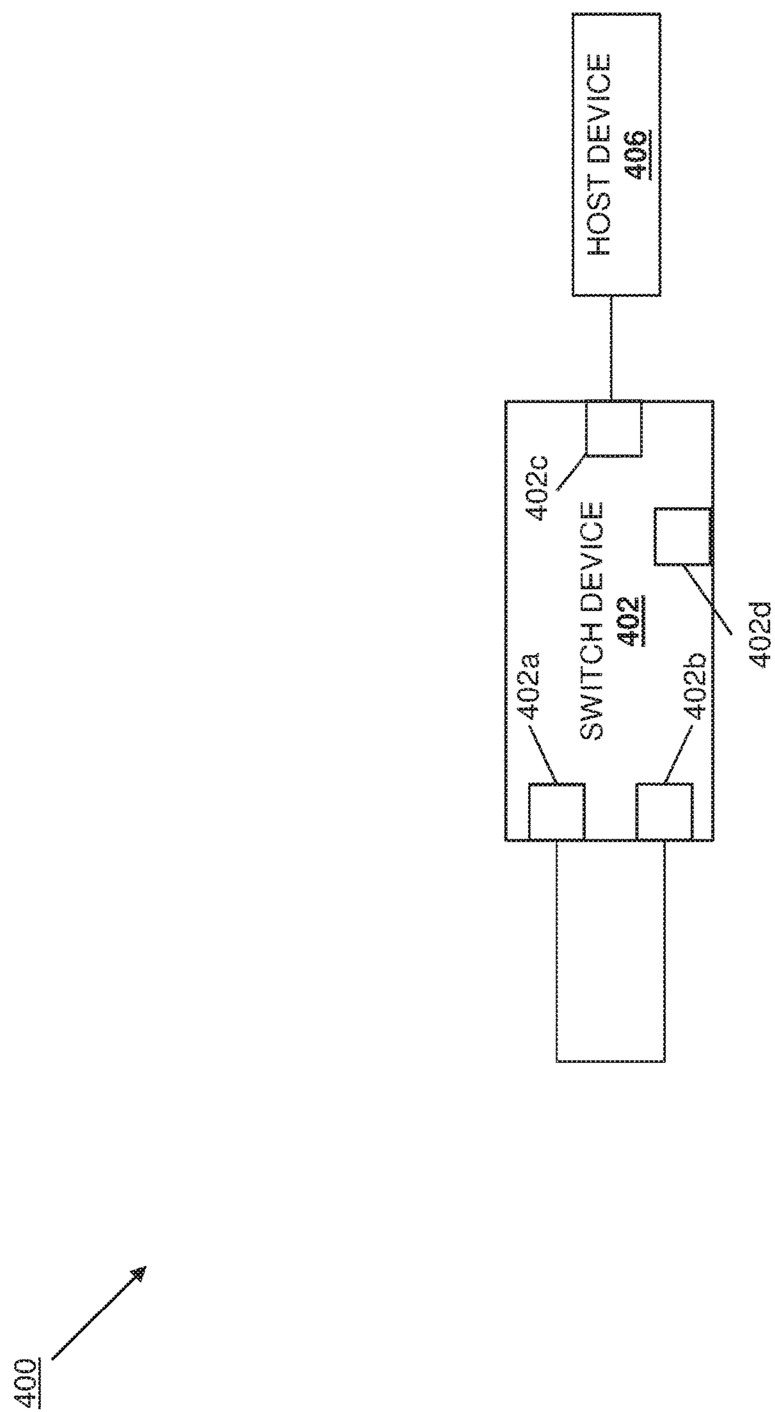
FIG. 4 is a schematic view illustrating an embodiment of a network of switch devices.

Referring now to FIG. 4, an embodiment of a network 400 is illustrated, the operation of which is described in some of the examples discussed below. The network 400 includes a switch device 402, which may be provided by the IHS 100 discussed above with reference to FIG. 1, and/or includes some or all of the components of the IHS 100. While a single switch device 402 is illustrated, other switch devices may be coupled to the switch device 402 while remaining within the scope of the present disclosure as well. Furthermore, while the networking device of the network 400 is discussed as a switch device, one of skill in the art in possession of the present disclosure would understand that the switch device 402 may be provided by bridge devices, router devices, and/or any other networking device that is configured with a spanning tree protocol. In the illustrated embodiment, the switch device 402 includes a port 402*a* that is linked to a port 402*b* on the switch device 402 (e.g., via an Ethernet cable), and a port 402*c* that is linked to a user computing device 406 (e.g., via an Ethernet cable). The ports 402*a*, 402*b*, and 402*c* of the switch device 402 may be access ports that are configured to provide access to the network 400 to user computing devices such as the user computing device 406, and configured to block spanning tree protocol traffic as discussed below. Furthermore, the switch device 402 may include a port 402*d* that may be a trunk port that is configured to connect to switch devices and allow spanning tree protocol traffic. In various embodiments, the switch device 402 may be a ToR switch, although other types of switch devices will benefit from the teachings of the present disclosure and thus fall within its scope as well.

While the ports 202*a*, 204*a*, 302*a*, 304*a*, 302*b*, 304*b*, 402*a*, and 402*b* in the switch devices that provide the networks 200, 300, 400 of FIGS. 2, 3, and 4 are described as being single ports, one of skill in the art in possession of the present disclosure would recognize that any or all of the ports 202*a*, 204*a*, 302*a*, 304*a*, 302*b*, 304*b*, 402*a*, and 402*b* may be provided by a plurality of ports that are configured as an aggregated link interface that groups those ports together to form a single logical interface, and may be referred to as a port channel, a Link Aggregation Group (LAG), a port trunk, a link bundle, an Ethernet/network/Network Interface Controller (NIC) bond, a NIC team, or other terminology that would be apparent to one of skill in the art in possession of the present disclosure. As such, the ports provided in each port 202*a*, 204*a*, 302*a*, 304*a*, 302*b*, 304*b*, 402*a*, and/or 402*b* may utilize a link aggregation protocol to aggregate ports such as, for example, Virtual Link Trunking (VLT) (an aggregation protocol available from DELL® Inc. of Round Rock, Tex. United States); the Link Aggregation Control Protocol (LACP); various Multi-Link Trunking (MLT) protocols; the Port Aggregation Protocol (PaGP); EtherChannel; and/or any other link aggregation protocol that would be apparent to one of skill in the art in possession of the present disclosure.

Figure 5:
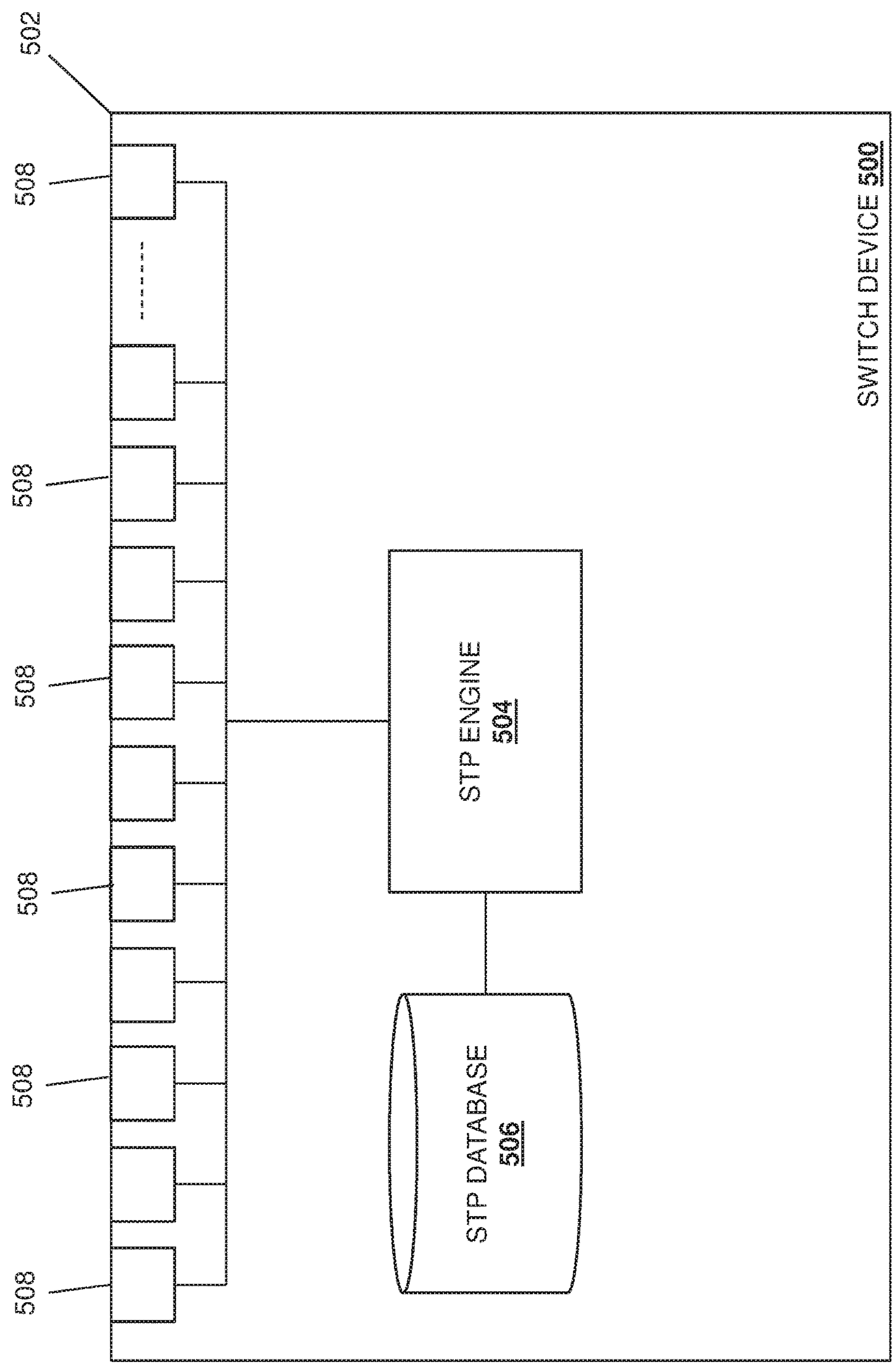
FIG. 5 is a schematic view illustrating an embodiment of a switch device that may be any of the switch devices in the networks of FIG. 2, 3, or 4.

Referring now to FIG. 5, an embodiment of a switch device 500 is illustrated that may provide any of the switch devices included in the networks 200, 300, and 400 discussed above. As such, the switch device 500 may be provided by the IHS 100 discussed above with reference to FIG. 1, and/or may include some or all of the components of the IHS 100. In the illustrated embodiment, the switch device 500 includes a chassis 502 that houses the components of the switch device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a spanning tree protocol engine 504 that is configured to perform the functions of the spanning tree protocol engines and switch devices discussed below. In a specific example, the spanning tree protocol engine 504 may include hardware and/or software such as spanning tree protocol traffic handling software that performs the spanning tree protocol traffic handling processes discussed below. In the examples discussed below, the spanning tree protocol engine 504 is configured to provide one or more of the rapid spanning tree protocol (RSTP), the multiple spanning tree protocol (MSTP), and the rapid per-Virtual Local Area Network (VLAN) spanning tree protocol (RPVSTP), although other versions of the spanning tree protocol are envisioned as falling within the scope of the present disclosure as well.

The chassis 502 may also house a storage system (not illustrated, but which may include the storage device 108 discussed above with reference to FIG. 1) that includes a spanning tree protocol database 506 that is coupled to the spanning tree protocol engine 504 (e.g., via a coupling between the storage system and the processing system), and that may store any of the information used to provide the functionality discussed below. In the embodiments discussed below, the spanning tree protocol database 506 is a persistent database that is configured to store a spanning tree protocol topology, but in different embodiments the spanning tree protocol database 506 may include combinations of persistent and non-persistent databases while remaining within the scope of the present disclosure. The chassis 502 may also house a communication system that is coupled to the spanning tree protocol engine 504 (e.g., via a coupling between the communication system and the processing system) and that includes a plurality of ports 508, any of which may provide the ports on the switch devices discussed below. In various embodiments, the ports 508 may be access ports when the switch device 500 is the switch device 202 of FIG. 2, while the ports 508 may be trunk ports when the switch device 500 is the switch device 204 of FIG. 2. However, in other examples, a first portion of the ports 508 may be configured as trunk ports while a second portion of the ports 508 may be configured as access ports. While a specific switch device has been illustrated and described, one of skill in the art in possession of the present disclosure will recognize that switch devices may include a variety of different components and/or component configurations that provide for conventional switch device functionality, as well as the functionality discussed below, while remaining within the scope of the present disclosure.

Figure 6:
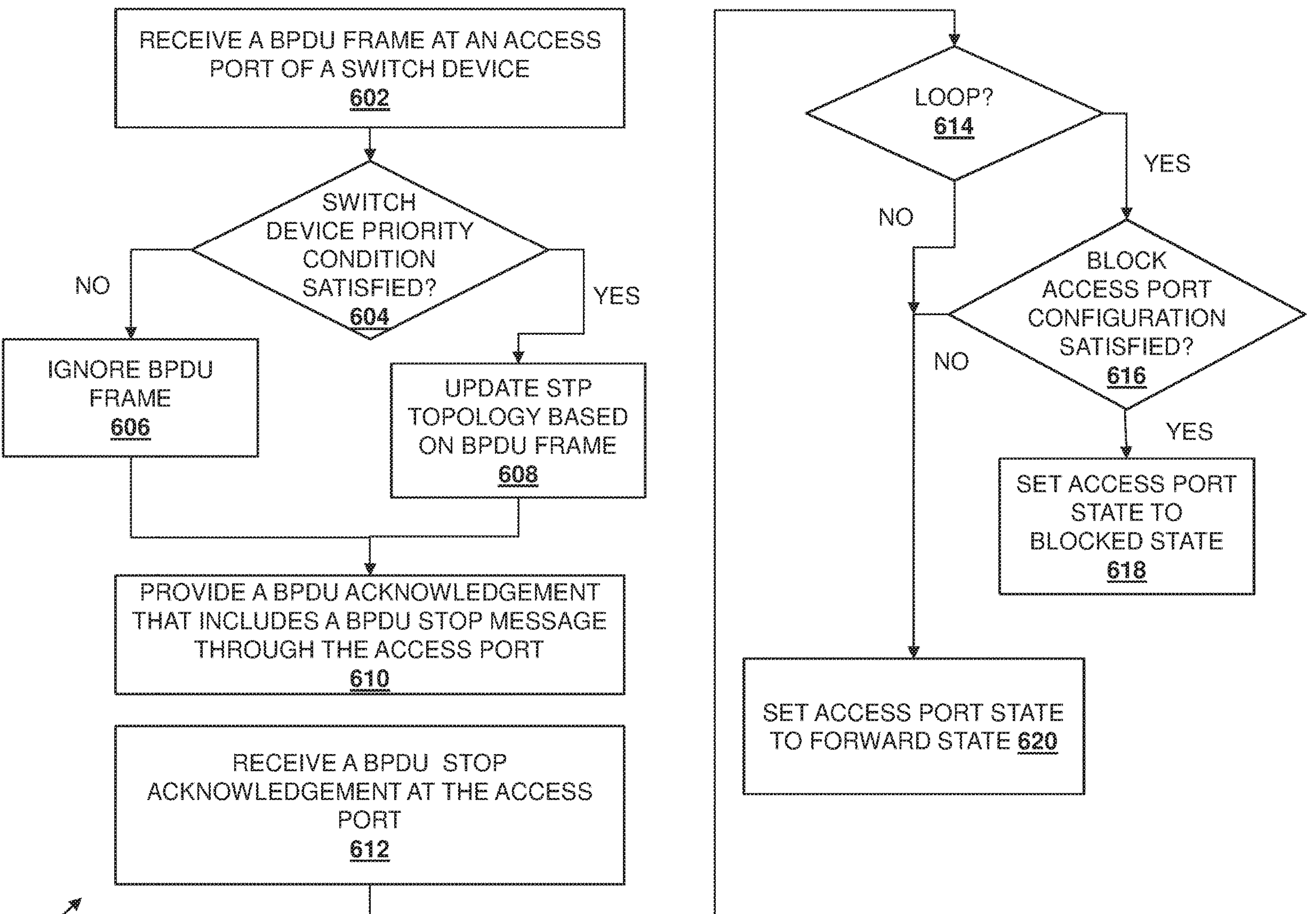
FIG. 6 is a flow chart illustrating an embodiment of a method of handling spanning tree protocol (STP) traffic.

Referring now to FIG. 6, an embodiment of a method 600 for handling spanning tree protocol traffic is illustrated. As discussed below, the systems and methods of the present disclosure allow switch devices that have a spanning tree protocol enabled to connect to access ports of another switch device that has a spanning tree protocol enabled without completely blocking the access port, which prevents the switch device coupled to the access port from becoming inaccessible through that port. This is enabled, at least in part, by a spanning tree protocol handling algorithm (e.g., BPDU Access Guard) that allows and accepts a first Bridge Protocol Data Unit (BPDU) frame at the access port, provides an acknowledgement with a BPDU stop request through the access port to the switch device that provided the BPDU, and sets an access port state of the access port to a forwarding state. Thus, the spanning tree protocol handling algorithm may block unnecessary BPDU traffic, which may reduce processor utilization, while still allowing communication with a switch device via an access port included on another switch device (e.g., a Top of Rack (ToR) switch). Also, embodiments of the present disclosure discussed herein prevent loop creation by blocking any additional connections between the switch device and a ToR switch, and preventing spanning tree protocol topology changes.

Figure 7:
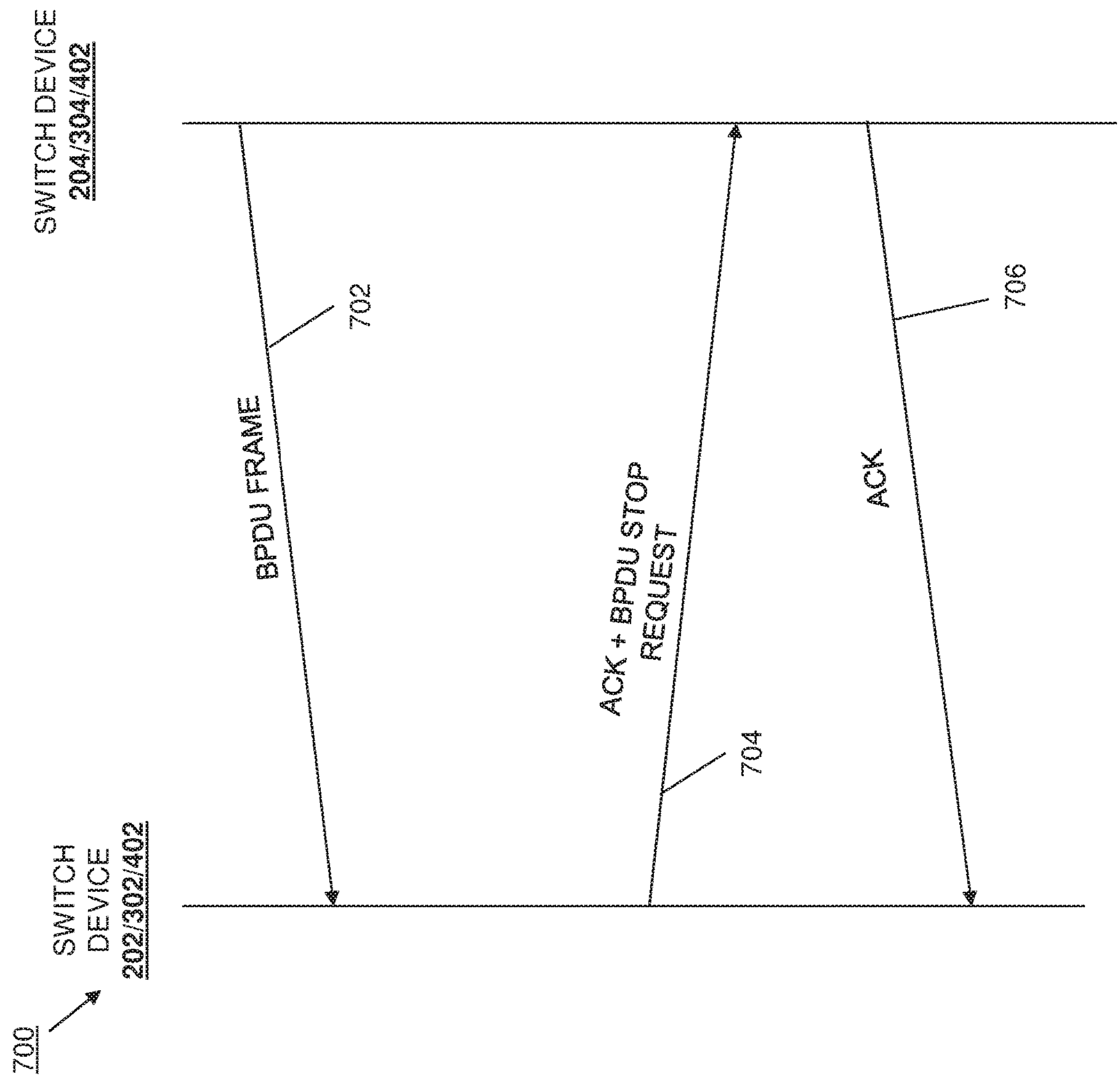
FIG. 7 is a workflow diagram illustrating an embodiment of STP traffic handling during the method of FIG. 6.

The method 600 begins at block 602 where a BPDU frame is received at an access port of a switch device. In an embodiment of block 602, and with reference to the spanning tree protocol traffic handling diagram 700 of FIG. 7, the spanning tree protocol engine 504 in the switch device 500, which may be any of the switch devices in the networks 200, 300, and 400 discussed below, may receive a BPDU frame 702 at a port 508 that is configured as an access port. The BPDU frame 702 may include information about the spanning tree protocol, and the switch devices in the network may use the BPDU frames to share information about themselves and their connections. As such, the BPDU frame 702 may include switch device information such as a switch identifier, a port identifier, a switch priority, a port priority, and/or any other switch device information that would be apparent to one of skill in the art in possession of the present disclosure. The BPDU frame 702 may also be used by the switch devices in the network to determine a topology of the network, which allows for use of the spanning tree protocol to disable ports to ensure that there are no loops within the network. As discussed above, the BPDU frame 702 in conventional systems is accepted on trunk ports to make changes to the spanning tree topology. However, if the BPDU frame 702 is received on an access port, the BPDU frame 702 may cause the access port on which it is received to be disabled in order to prevent switch devices from entering the network through access ports. BPDU traffic handling algorithms such as BDPU-Guard and BDPU-Filter are conventionally used on access ports to handle BPDU traffic, with BDPU-Guard shutting down a port if a BDPU frame is received, and BDPU-Filter preventing ingress and egress BDPU frames to essentially disable the spanning tree protocol on those ports.

In an embodiment of block 602, and with reference to the network 200 of FIG. 2, the BPDU frame 702 may be sent from the switch device 204 via the port 204*a*, and received by the switch device 202 via its port 202*a* that is configured as an access port. Similarly, with reference to the network 300 of FIG. 3, the BPDU frame 702 may be sent from the switch device 304 via the port 304*a*, and received by the switch device 302 via its port 302*a* that is configured as an access port. In addition, another BPDU frame 702 may be sent from the switch device 304 via the port 304*b*, and received by the switch device 302 via its port 302*b*. As will be recognized by one of skill in the art in possession of the present disclosure, the two links provided between the ports 302*a* and 304*a*, and the ports 402*b* and 304*b*, respectively form a loop between the switch device 302 and the switch device 304. With reference to the network 400 of FIG. 4, the BPDU frame 702 may be sent from the switch device 402 via the port 402*a*, and received via the port 402*b* on that same switch device 402, and another BPDU frame 702 may be sent from the switch device 402 via the port 402*b*, and received via the port 402*a* on that same switch device 402. As will be recognized by one of skill in the art in possession of the present disclosure, the link between the ports 402*a* and 402*b* creates a loop at the switch device 402.

The method 600 then proceeds to decision block 604 where it is determined whether a switch device priority of the switch device satisfies a switch device priority condition. In an embodiment of decision block 604, the spanning tree protocol engine 504 may determine whether a switch device priority of the switch device 500 satisfies a switch device priority condition. For example, each switch in the networks 200, 300, and 400 may be assigned a switch device priority (e.g., a bridge ID priority). The spanning tree protocol engine 504 may obtain the switch device priority of the switch device that sent the BPDU frame 702 from that BPDU frame 702. The spanning tree protocol engine 504 may then determine whether the switch device priority of the switch device 500 that received the BPDU frame 702 satisfies a switch device priority condition such as, for example, having a lower switch device priority than the switch device that sent the BPDU frame 702, and/or any other switch device priority condition that would be apparent to one of skill in the art in possession of the present disclosure. If the switch device condition is not satisfied, the method 600 may proceed to block 606 where the BPDU frame 702 is ignored, which results in the spanning tree protocol topology stored in the spanning tree protocol database 506 not being updated based on the BPDU frame 702. Similarly, if the BPDU frame 702 is received from an access port, the spanning tree protocol topology is not update irrespective of priority.

However, if the switch device condition is determined at decision block 604 to be satisfied, the method 600 then proceeds to block 608 where the spanning tree topology database is updated based on the BPDU frame. In an embodiment of block 608, the spanning tree protocol engine 504 may update the spanning tree protocol topology in the spanning tree protocol database 506 with switch device information, network information, port information, spanning tree protocol topology information, and/or any other information that may be included in the BPDU frame 702 and that would be apparent to one of skill in the art in possession of the present disclosure.

In an embodiment of blocks 604, 606, and 608, and with reference to the network 200 of FIG. 2, the switch device 202 may be assigned a switch device priority of "16384" while the switch device 204 may be assigned a switch device priority "20480." Because the switch device 202 has a switch device priority that is lower than the switch device priority of the switch device 204, the switch device 202 may update its spanning tree protocol topology at block 608 of method 600 based on the information provided in the BPDU frame 702. However, in other examples, the switch device 204 may be assigned a switch device priority "0" and, because the switch device 202 has a switch device priority that is higher than the switch device priority of the switch device 204 in those examples, the switch device 202 may ignore the BPDU frame 702 at block 606 of method 600.

From either block 606 or block 608, the method 600 may then proceed to block 610 where a BPDU acknowledgement that includes a BPDU stop message is provided through the access port through which the BPDU frame was received. In an embodiment of block 610, the spanning tree protocol engine 504 may send, via the port 508 that is configured as an access port and that received the BPDU frame 702, a BPDU acknowledgement that includes a BPDU stop request. For example, the BPDU stop request may cause the switch device 500 that sent the BPDU frame to stop sending subsequent BPDU frames to the access port that sent the BPDU stop request. However, if the port through which the BPDU stop request was received goes down, fails, or otherwise becomes unavailable, and then becomes available after a predetermined time condition (e.g., after 10 seconds, after 20 seconds, after 30 seconds, after 1 minute, etc.) has been satisfied, then the switch device may send another BPDU frame to the access port to which it is connected. If the switch device becomes available before the predetermined time condition has been satisfied, the switch device may continue to prevent BPDU frames from being sent to the access port to which it is connected (e.g., because there likely are no changes in the spanning tree protocol topology within that time period.)

In an embodiment of block 610, and with reference to the network 200 of FIG. 2, the BPDU acknowledgement 704 that includes the BPDU stop request may be sent from the switch device 202 via the port 202*a* that is configured as an access port, and received by the switch device 204 via the port 204*a*. The BPDU stop request may prevent the switch device 204 from sending any additional BPDU frames through the port 204*a*, unless the port 204*a* becomes unavailable and then becomes available again, after a predetermined time condition has been satisfied.

In an embodiment of block 610, and with reference to the network 300 of FIG. 3, the BPDU acknowledgement 704 that includes the BPDU stop request may be sent from the switch device 202 via the port 302*a* that is configured as an access port, and received by the switch device 304 via the port 304*a*. The BPDU stop request may prevent the switch device 304 from sending any additional BPDU frames through the port 304*a*, unless the port 304*a* becomes unavailable and then becomes available again after a predetermined time condition has been satisfied. Similarly, the BPDU acknowledgement 704 that includes the BPDU stop request may be sent from the switch device 302 via the port 302*b* that is configured as an access port, and received by the switch device 304 via the port 304*b* of the switch device 304. The BPDU stop request may prevent the switch device 304 from sending any additional BPDU frames through the port 304*a*, unless the port 304*a* becomes unavailable and then becomes available again after a predetermined time condition has been satisfied. However, in other embodiments and as discussed further below, the BPDU acknowledgement 704 that includes the BPDU stop request may not be sent via the port 302*b*, as the port 302*b* may be disabled to prevent the loop scenario illustrated in network 300 based on the spanning tree protocol provided by the spanning tree protocol engine 504. For example, the port 302*b* may be disabled based on a port priority of the port 302*b* and a port priority of the port 302*a*.

In an embodiment of block 610, and with reference to the network 400 of FIG. 4, the BPDU acknowledgement 704 that includes the BPDU stop request may be sent from the switch device 402 via the port 402*a* that is configured as an access port, and received by the switch device 402 via the port 402*b*. Likewise, the BPDU acknowledgement 704 that includes the BPDU stop request may be sent from the switch device 402 via the port 402*b* that is configured as an access port, and received by the switch device 402 via the port 402*a*. The BPDU stop request from 402*b* may prevent the switch device 402 from sending any additional BPDU frames through the port 402*a*, unless the port 402*a* becomes unavailable and then becomes available again after a predetermined time condition has been satisfied. Likewise, the BPDU stop request from port 402*a* may prevent the switch device 402 from sending any additional BPDU frames through the port 402*b*, unless the port 402*b* becomes unavailable and then becomes available again after a predetermined time condition has been satisfied. However, in other embodiments and discussed further below, the BPDU acknowledgement 704 that includes the BPDU stop request may not be sent via one of the ports 402*a* or 402*b*, as one of the ports 402*a* or 402*b* may be disabled to prevent the loop scenario illustrated in network 400 based to the spanning tree protocol. For example, the port 402*b* may be disabled based on a port priority of the port 402*b* and a port priority of the port 402*a*.

The method 600 may then proceed to block 612 where a BPDU stop acknowledgement is received at the access port. In an embodiment of block 612, and with reference to the spanning tree protocol traffic handling diagram 700 of FIG. 7, the spanning tree protocol engine 504 in a switch device may receive a BPDU stop acknowledgement 706 at the access port from the spanning tree protocol engine 504 of a switch device that received the BPDU acknowledgement 704. In an embodiment of block 612, and with reference to the network 200 of FIG. 2, the BPDU stop acknowledgement 706 may be sent from the switch device 204 via port 204*a*, and received by the switch device 202 via the port 202*a* that is configured as an access port. Similarly, with reference to the network 300 of FIG. 3, the BPDU stop acknowledgement 706 may be sent from the switch device 304 via the port 304*a*, and received by the switch device 302 via the port 302*a* that is configured as an access port. In addition, the BPDU stop acknowledgement 706 may be sent from the switch device 304 via the port 304*b*, and received by the switch device 302 via the port 302*b* if the port 302*b* is not already disabled by the spanning tree protocol engine 504 of switch device 302. With reference to the network 400 of FIG. 4, the BPDU stop acknowledgement 706 may be sent from the switch device 402 via the port 402*a*, to the port 402*b* of the same switch device 402 if the port 402*b* is not already disabled by the spanning tree protocol engine 504 of the switch device 402. In addition, the BPDU stop acknowledgement 706 may be sent from the switch device 402 via the port 402*b* to the port 402*a* of the switch device 402 as well.

The method 600 may then proceed to decision block 614 where it is determined whether a loop exists between the access ports on the switch device. In an embodiment of decision block 614, the spanning tree protocol engine 504 may determine whether a loop exists on the ports 508. For example, the spanning tree protocol engine 504 may determine from BPDU frames 702 received on the ports 508 whether any of the BPDU frames 702 were received from the same switch device (which may indicate a loop) by comparing switch device identifiers received in the BPDU frames 702.

If a loop exists, then the method 600 may proceed to decision block 616 where it is determined whether a block access port condition is satisfied for each port associated with the loop. In an embodiment of decision block 616, the spanning tree protocol engine 504 may determine which of the ports associated with the loop satisfy a block access port condition, which is indicative that an access port state of one or more access ports in the loop should be set to a blocked state (e.g., an error disable role & Error Disable State (EDS)) that is configured to prevent network traffic from being provided through the port. For example, the spanning tree protocol engine 504 may determine that an access port priority of a port associated with the loop satisfies a block access port priority condition. Specifically, port(s) with the lowest access port priority may be set to the blocked state as decided by the particular spanning tree protocol process. However, one of skill in the art in possession of the present disclosure will recognize that other block access port conditions may be used to determine which ports of a loop to block. If at decision block 616 a blocked access port condition is satisfied by the port, then the method 600 proceeds to block 618 where the access port state of the port is blocked, and the method 600 may return to decision block 616 to determine if any other port of the loop needs to be checked.

If, at decision block 616, the port does not satisfy the block access port condition, or if at decision block 614 it is determined that no loop exists, then the method 600 may proceed to block 620 where an access port state of the access port may be set to a forwarding state. In an embodiment of block 620, the spanning tree protocol engine 504 in a switch device may set the access port state of the port 508 of the switch device that received the BPDU frame 702 in block 602 to a forwarding state when no loop exists. Also, when the block access port condition is not satisfied, the access port state may be set to the forwarding state. As would be understood by one of skill in the art in possession of the present disclosure, the forwarding state may allow network traffic such as Ethernet data packets to be provided between the access port and the port that sent the BPDU frame 702.

In an embodiment, with reference to the network 200 of FIG. 2, decision block 614, decision block 616, block 618, and block 620—may cause the spanning tree protocol engine 504 in the switch device 202 to determine that no loop exists, as the port 202*a* is only connected to the switch device 204. As such, the spanning tree protocol engine 504 may set the access port state of the port 202*a* to a forwarding state such that network traffic may be communicated between the port 202*a* on the switch device 202 and the port 204*a* on the switch device 204.

In an embodiment, with reference to the network 300 of FIG. 3, decision block 614, decision block 616, block 618, and block 620, may cause the spanning tree protocol engine 504 in switch device 302 to determine that a loop exists on its ports 302*a* and 302*b*. For example, based on the BPDU frames 702 received by each of the port 302*a* and the port 302*b*, the spanning tree protocol engine 504 may determine that the ports 302*a* and 302*b* are both connected to ports of the switch device 304, which creates a loop. The spanning tree protocol engine 504 may then determine which of the ports 302*a* and 302*b* to block or otherwise disable based on the block access port condition discussed above. For example, the spanning tree protocol engine 504 may disable the port with the lowest access port priority. In a specific example, the port 302*a* may be assigned an access port priority of "48", while the port 302*b* may be assigned an access port priority of "47", and because the port 302*b* is assigned the lowest access port priority, an access port state of the port 302*b* may be set to a blocked state (e.g., error disable role and EDS state), while the access port state of the port 302*a* may be set to a forwarding state. The forwarding state of the port 302*a* may allow network traffic to be communicated between the port 302*a* on the switch device 302 and the port 304*a* on the switch device 304. However, in the event that the port 302*a* becomes unavailable or fails, the port 302*b* may be changed from the blocked state to the forwarding state by the spanning tree protocol engine 504.

In an embodiment, with reference to the network 400 of FIG. 4, decision block 614, decision block 616, block 618, and block 620 may cause the spanning tree protocol engine 504 of switch device 402 to determine that a loop exists on its ports 402*a* and 402*b*. For example based on the BPDU frames 702 received by each of the port 402*a* and the port 402*b*, the spanning tree protocol engine 504 may determine that the ports 402*a* and 402*b* are both connected to ports of the switch device 402, which creates a loop. The spanning tree protocol engine 504 may then determine which of the ports 402*a* and 402*b* to block from receiving network traffic based on the block access port condition discussed above. For example, the spanning tree protocol engine 504 may block network traffic at the port with the lowest access port priority. In a specific example, the port 402*a* may be assigned an access port priority of "48", while the port 402*b* may be assigned an access port priority of "47", and because the port 402*b* is assigned the lowest access port priority, an access port state of the port 402*b* may be set to a blocked state (e.g., error disable role and EDS state), while the access port state of the port 402*a* is set to a forwarding state. The forwarding state of the port 402*a* may allow network traffic to be communicated from the port 402*a* of the switch device 402 to the port 402*b* of the switch device 402.

Thus, systems and method have been described that provide for the handling of spanning tree protocol traffic at an access port of a switch device in a network such that another switch device may connect to that access port without that access port being disabled. As a result, network traffic may be communicated by the switch device connected to the access port through that access port without that network traffic being blocked. For example, if a campus network switch device that does not have a dedicated management port is coupled to an access port of a Top of Rack (ToR) switch, such a connection conventionally results in unwanted changes to the spanning tree protocol topology via a BPDU frame sent by the campus network switch to the ToR switch. If BPDU-Guard or BPDU-Filter is enabled for the spanning tree protocol in such conventional systems, the BPDU frame sent from the campus network switch will cause the access port to be disabled (e.g., traffic will not be provided over that access port when using BPDU-Guard, or the spanning tree protocol will essentially be disabled and result in loops when using BPDU-Filter.) As such, the systems and methods of the present disclosure may replace BPDU-Guard and BPDU-filter, and accept a first BPDU frame at the access port in order to make changes to the spanning tree protocol topology to prevent loops, and then request the campus network switch device to stop sending BPDU frames. The access port may then be set to a forwarding state to allow network traffic between the campus network switch device and the ToR switch device. Thus, the systems and methods of the present disclosure prevent unnecessary BPDU traffic from being sent by the campus network switch device, allow the campus network switch device to communicate network traffic through an access port of the ToR switch device, prevent loop creation by blocking any additional connections between the campus network switch device and the ToR switch device, and a do not result in changes to spanning tree protocol topology of the network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spanning tree protocol traffic handling system, comprising:

a first networking device; and a second networking device that is coupled to the first networking device via a first access port that is included on the second networking device and that is configured to couple with a host device, wherein the second networking device is configured to:

receive a Bridge Protocol Data Unit (BPDU) frame through the first access port;

send an acknowledgement that includes a BPDU stop request and that is configured to cause the first networking device to stop sending BPDU frames to the first access port; and set an access port state of the first access port to a forwarding state.

2. The system of claim 1, wherein the second networking device is further configured to:

update an spanning tree protocol topology database based on the BPDU frame.

3. The system of claim 2, wherein the updating the spanning tree protocol topology database based on the BPDU frame is performed in response to the second networking device determining that a first networking device priority of the first networking device and a second networking device priority of the second networking device satisfy a networking device priority condition.

4. The system of claim 1, wherein the second networking device is coupled to the first networking device via a second access port that is included on the second networking device, and wherein the second networking device is further configured to:

determine that a first access port priority of the first access port and a second access port priority of the second access port satisfy an access port priority condition and, in response, set an access port state of the second access port to a blocking state.

5. The system of claim 4, wherein the second networking device is further configured to:

determine that the first access port has failed and, in response, set the access port state of the second access port to the forwarding state.

6. The system of claim 1, wherein the first networking device and the second networking device are provided in the same chassis and the second networking device includes a second access port.

7. The system of claim 6, wherein second networking device is configured to:

determine that a first access port priority of the first access port and a second access port priority of the second access port satisfy an access port priority condition and, in response, set an access port state of the second access port to a blocking state.

8. An information handling system (IHS), comprising:

a first access port;

a processing system that is coupled to the first access port; and a memory system that is coupled to the processing system and that includes instruction that, when executed by the processing system, cause the processing system to provide a spanning tree protocol engine that is configured to:

receive a Bridge Protocol Data Unit (BPDU) frame through the first access port;

send an acknowledgement that includes a BPDU stop request and that is configured to cause BPDU frames to stop being sent to the first access port; and set an access port state of the first access port to a forwarding state.

9. The IHS of claim 8, wherein the spanning tree protocol engine is further configured to:

update a spanning tree protocol topology database based on the BPDU frame.

10. The IHS of claim 9, wherein the updating the spanning tree protocol topology database based on the BPDU frame is performed in response to determining that a networking device priority condition is satisfied.

11. The IHS of claim 8, further comprising:

a second access port coupled to the processing system, wherein the spanning tree protocol engine is further configured to:

receive a Bridge Protocol Data Unit (BPDU) frame through the second access port; and determine that a first access port priority of the first access port and a second access port priority of the second access port satisfy an access port priority condition and, in response, set an access port state of the second access port to a blocking state.

12. The IHS of claim 11, wherein the spanning tree protocol engine is further configured to:

determine that the first access port has failed and, in response, set the access port state of the second access port to the forwarding state.

13. The IHS of claim 8, further comprising:

a second access port coupled to the processing system, wherein the spanning tree protocol engine is further configured to:

provide the BPDU frame through the second access port to the first access port; and stop sending BPDU frames through the second access port in response to the acknowledgement that includes the BPDU stop request being received.

14. The IHS of claim 13, wherein the spanning tree protocol engine is further configured to:

determine that a first access port priority of the first access port and a second access port priority of the second access port satisfy an access port priority condition and, in response, set an access port state of the second access port to a blocking state.

15. A method for handling spanning tree protocol traffic, comprising:

receiving, by a networking device that includes a first access port, a Bridge Protocol Data Unit (BPDU) frame through the first access port;

sending, by the networking device, an acknowledgement that includes a BPDU stop request and that is configured to cause BPDU frames to stop being sent to the first access port; and setting, by the networking device, an access port state of the first access port to a forwarding state.

16. The method of claim 15, further comprising:

updating a spanning tree protocol topology database based on the BPDU frame.

17. The method of claim 16, wherein the updating the spanning tree protocol topology database based on the BPDU frame is performed in response to determining, by the networking device, that a networking device priority condition is satisfied.

18. The method of claim 15, further comprising:

receiving, by the networking device, a Bridge Protocol Data Unit (BPDU) frame through a second access port; and determining, by the networking device, that an access port priority of the second access port satisfies a block access port priority condition and, in response, setting an access port state of the second access port to a blocking state.

19. The method of claim 18, further comprising:

determining, by the networking device, that the first access port has failed and, in response, setting the access port state of the second access port to the forwarding state.

20. The method of claim 18, further comprising:

providing, by the networking device, the BPDU frame through the second access port to the first access port; and preventing, by the networking device, BPDU frames from being sent through the second access port in response to the acknowledgement that includes the BPDU stop request being received at the second access port.

* * * * *